US012779809B2

(12) United States Patent
Sahin et al.

(10) Patent No.: US 12,779,809 B2
(45) Date of Patent: Nov. 3, 2026

(54) CORNET CONE PACKAGE PRODUCTION MACHINE WITH HORIZONTAL FEEDING

(71) Applicant: Mondi Kale Nobel Ambalaj Sanayi Ve Ticaret Anonim Sirketi, Bakirkoy (TR)

(72) Inventors: Umit Sahin, Luleburgaz (TR); Mehmet Ulas Ipek, Bakirkoy (TR)

( * ) Notice: Subject to any disclaimer, the term of this patent is extended or adjusted under 35 U.S.C. 154(b) by 212 days.

(21) Appl. No.: 18/850,672

(22) PCT Filed: Aug. 2, 2022

(86) PCT No.: PCT/TR2022/050809

§ 371 (c)(1),
(2) Date: Sep. 25, 2024

(87) PCT Pub. No.: WO2023/195942

PCT Pub. Date: Oct. 12, 2023

(65) Prior Publication Data

US 2025/0205989 A1 Jun. 26, 2025

(30) Foreign Application Priority Data

Apr. 8, 2022 (TR) ................................ 2022/005634

(51) Int. Cl.

| | |
|---|---|
| ***B31C 7/10*** | (2006.01) |
| ***A23G 9/50*** | (2006.01) |
| ***B31B 50/06*** | (2017.01) |
| ***B31B 50/34*** | (2017.01) |

(52) U.S. Cl.
CPC ................ *B31C 7/10* (2013.01); *A23G 9/506* (2013.01); *B31B 50/06* (2017.08); *B31B 50/34* (2017.08)

(58) Field of Classification Search
CPC ........... B31C 7/10; B31B 50/06; B31B 50/34; A23G 9/506
USPC .......................................................... 493/152
See application file for complete search history.

(56) References Cited

U.S. PATENT DOCUMENTS

| | | | | |
|---|---|---|---|---|
| 2,612,016 A | 9/1952 | Anderson | | |
| 4,259,827 A | 4/1981 | Stohlquist | | |
| 6,200,406 B1 * | 3/2001 | Ito | B31B 50/00 | 156/250 |

FOREIGN PATENT DOCUMENTS

| | | | |
|---|---|---|---|
| EP | 1864791 A1 | 12/2007 | |
| JP | 59167405 A * | 9/1984 | |
| JP | S59167405 A | 9/1984 | |
| WO | WO-2021096452 A1 * | 5/2021 | B65B 5/02 |

OTHER PUBLICATIONS

International Search Report for corresponding PCT/TR2022/050809, dated Jan. 6, 2023.
Written Opinion of the International Searching Authority for corresponding PCT/TR2022/050809, dated Jan. 6, 2023.
Extended European Search Report for EP Application No. 22936673, dated Feb. 13, 2026.

* cited by examiner

*Primary Examiner* — Veronica Martin
*Assistant Examiner* — Mary C Hibbert-Copeland
(74) *Attorney, Agent, or Firm* — Egbert, McDaniel & Swartz, PLLC

(57) ABSTRACT

Disclosed is a production machine which is used in producing the cornet cone packages used in the packaging of cornet-type ice-creams and which provides for the cornet cone packages to be horizontally fed and brought into a cone shape by being crimped.

7 Claims, 2 Drawing Sheets

CORNET CONE PACKAGE PRODUCTION MACHINE WITH HORIZONTAL FEEDING

TECHNICAL FIELD

Figure 1:
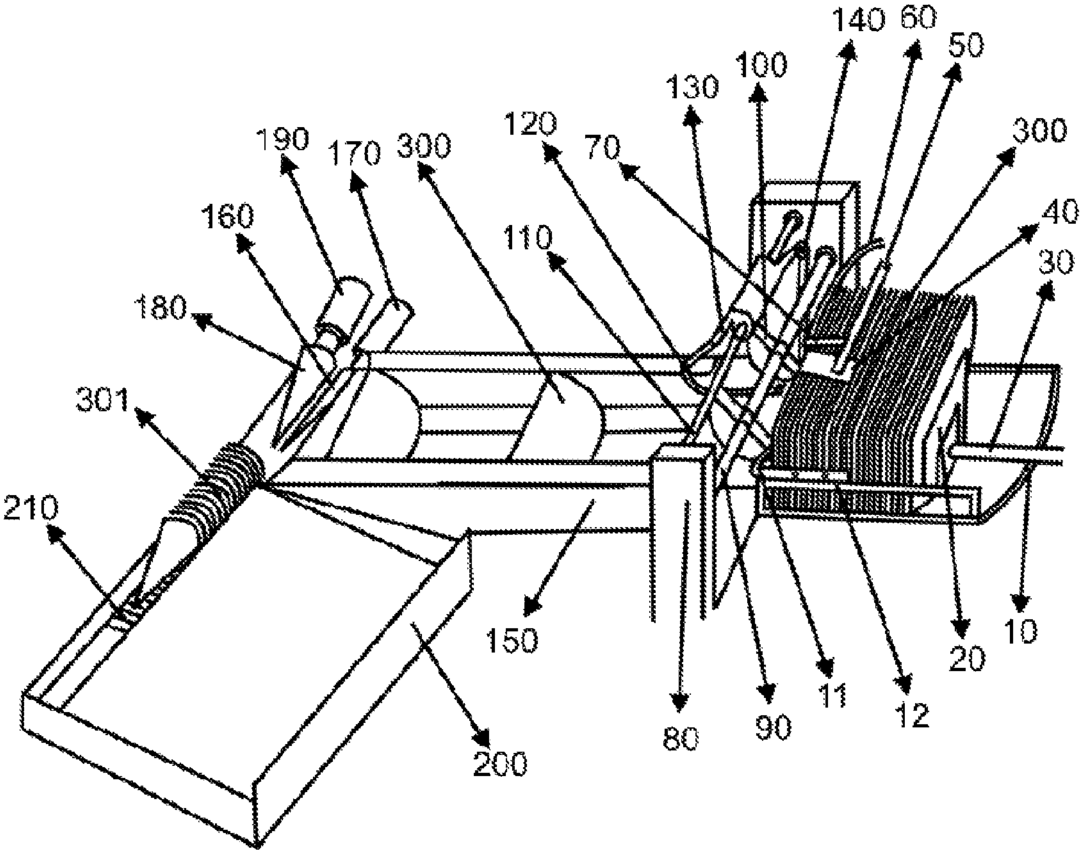

The invention is related to a cornet cone package production machine with horizontal feeding used in the production of cornet cone packages used in the packaging of cornet-type ice-creams.

The invention is particularly related to a cornet cone package production machine with horizontal feeding which provides for the cornet cone packages to be horizontally fed and brought into a cone shape by being crimped.

PRIOR ART

Cornet-type ice-creams are among the top popular ice-creams frequently consumed. These ice-creams basically have conically shaped cornets filled with ice-creams having contents such as chocolate, toppings, fruits, nuts etc. Said cornets are sold by being placed in sleeve-like packages that cover the cornet part.

In the art, the standard cornet cone packages are cut into specific shapes before production and produced by being crimped into a conical shape in crimping machines. For this purpose, the cornet cone packages cut are stacked in order to be transferred to the crimping machines after the cutting process. The crimping machines shape the specifically shaped packages that are stacked into cones by crimping the same through rotation and form cone packages that are suitable for cornet cones. However, during the transmission of the specifically shaped packages to the crimping machine, problems such as deformation, tearing, and flying away are encountered and errors occur in production.

As a result of the research of the literature, document number EP1864791 can be given as an example of the known state of the art. Said document is related to the procedure for the production of conical ice-cream packages. In said invention, the production of the cornet cone packages after a four-step procedure has been mentioned. In the first stage the straight package bobbin is divided into specifically shaped stripes by means of a custom knife structure and having been divided into specific shapes the bobbin comes out of the machine in two ways as plane or reverse. In the second stage the reverse stripe is turned by a turning machine and readied for the cutting machine. In the third stage the bobbins prepared are transferred to the crimping machine by being subjected to a cutting procedure and in the fourth stage, the pieces coming out of the cutting machine are transformed into cone packages by crimping. In said invention, a method which produces cone packages with separate machines has been described. This requires multiple processes for various stages in the cone package production.

In consequence, the presence of the above-mentioned problems and inefficiency of the present solutions requires a development in the related technical field.

PURPOSE OF THE INVENTION

The present invention is related to a cornet cone package production machine with horizontal feeding that eliminates the above-mentioned disadvantages and brings new advantages to the related technical field.

The main purpose of the invention is to present a production machine which provides that the cornet cone packages are horizontally fed and brought to a cone shape by being crimped.

The purpose of the invention is to provide that the cornet cone packages are directed by being rotated by means of disks with the help of air by being stacked next to each other horizontally and in an orderly manner, crimped by being pushed in between the crimping heads, and stacked within each other by being brought into a cone shape after the crimping.

Another purpose of the invention is to provide that the production is carried out without errors with the cornet cone packages that are stacked next to each other horizontally being transferred properly in between the crimping heads.

Another purpose of the invention is to provide that the specifically shaped cornet cone packages are stacked over a single machine, transferred automatically to the crimping procedure, brought to a cone shape by being crimped and packages that are brought into a cone shape are stacked within each other.

In order to fulfill all the purposes that are mentioned above and that can be inferred from the detailed description; the invention is a production machine which is used in producing the cornet cone packages used in the packaging of cornet-type ice-creams and which provides for the cornet cone packages to be horizontally fed and brought into a cone shape by being crimped, comprising

- a stacking table which stacks the cornet cone packages side by side,
- a pusher table which advances the cornet cone packages on the stacking table forward from the back side,
- an upper pressing table which prevents the cornet cone packages on the stacking table from getting mixed by pressing on the same,
- an air hose which provides that the cornet cone packages on the stacking table are separated from each other by blowing air to them by means of at least one hose arm,
- an axle fixing unit which is positioned at the front of the stacking table,
- a semicircle disk in the form of half a circle which makes a rotational movement on the axle fixing unit and holds the cornet cone packages on the stacking table at certain intervals and pulls the same,
- a separator arm which moves back and forth by being connected on the axle fixing unit and advances one cornet cone package at a time with its back-and-forth movement,
- a fixing arm which is connected to the separator arm, and which moves up and down by means of the separator movement arm that moves up and down,
- a sled which extends forwards from the back surface of the axle fixing unit and carries the cornet cone packages pulled with the semicircle disk for the crimping procedure,
- a lower crimping head and an upper crimping head which crimp the cornet cone packages carried inside the sled and bring them into conical cone packages, having reverse rotational movements,
- a cone stacking unit which is positioned opposite the lower crimping head and upper crimping head, and which stacks the conical cone packages within each other,
- a cone conveyor belt which pulls the conical cone packages into the cone stacking unit from the lower crimping head and upper crimping head.

The structural and characteristic features and all the advantages of the invention will be understood more clearly thanks to the figures given below and the detailed description written by making references to these figures. Therefore, the evaluation should be made in consideration of these figures and the detailed description.

FIGURES AIDING THE DESCRIPTION OF THE INVENTION

FIG. 1: Representative view of the cornet cone package production machine of the invention.

Figure 2:
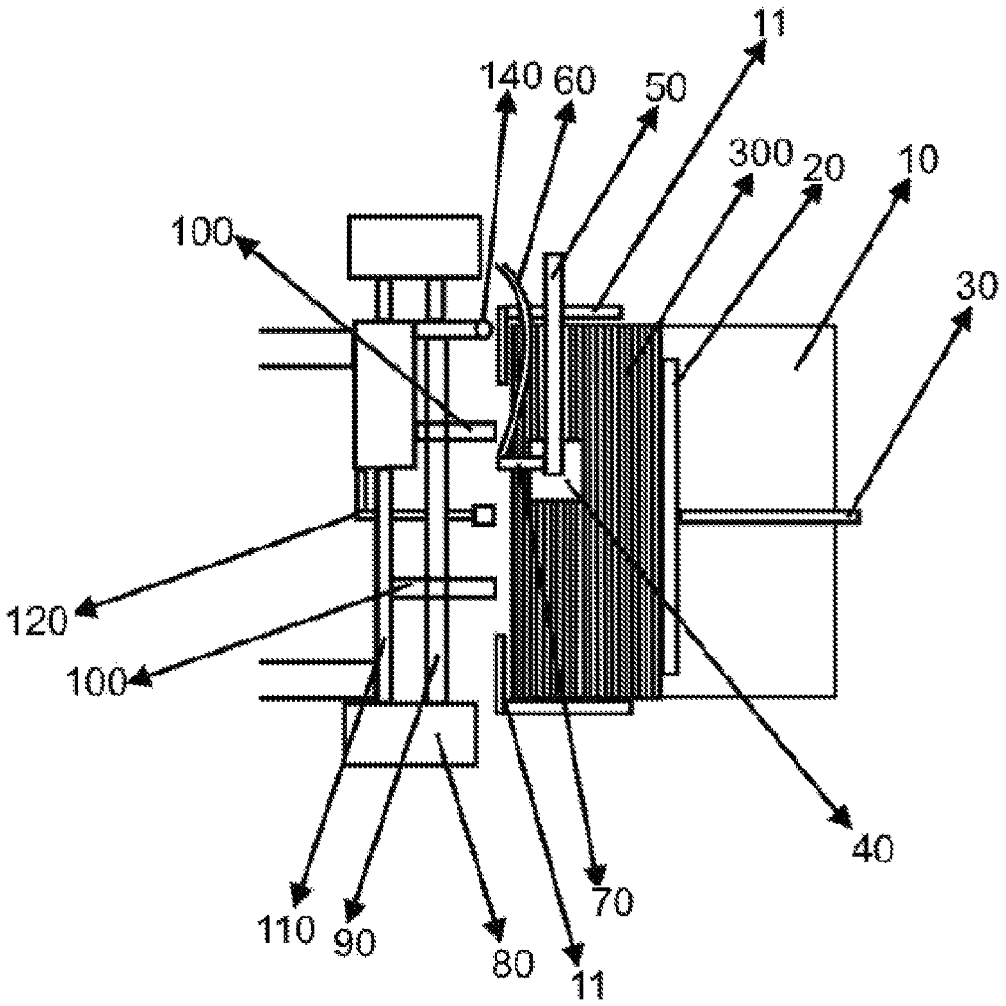

FIG. 2: Detailed view of the cornet cone package production machine of the invention.

DESCRIPTION OF THE REFERENCE PARTS

10. Stacking table
11. Limiter arm
12. Arranging arm
20. Pusher table
30. Pusher arm
40. Upper pressing table
50. Upper pressing arm
60. Air hose
70. Hose arm
80. Axle fixing unit
90. Semicircle disk axle
100. Semicircle disk
110. Separator axle
120. Separator arm
130. Fixing arm
140. Separator movement arm
150. Sled
160. Lower crimping head
170. Lower crimper motor
180. Upper crimping head
190. Upper crimper motor
200. Cone stacking unit
210. Cone conveyor belt
300. Cornet cone package
301. Conical cone package

DETAILED DESCRIPTION OF THE INVENTION

In this detailed description the preferred alternatives of the production machine of the invention are described only for a better understanding of the subject and in the way to create no limiting effect whatsoever.

In FIG. 1, representational view of the production machine of the invention has been given. Accordingly, the production machine basically comprises a stacking table (10) which stacks the cornet cone packages (300) side by side, a pusher table (20) which advances the cornet cone packages (300) on the stacking table (10) forward from the back side, an upper pressing table (40) which prevents the cornet cone packages (300) on the stacking table (10) from getting mixed by pressing on the same, an air hose (60) which provides that the cornet cone packages (300) on the stacking table (10) are separated from each other by blowing air to them by means of at least one hose arm (70), an axle fixing unit (80) which is positioned at the front of the stacking table (10), a semicircle disk (100) in the form of half a circle which makes a rotational movement by means of the semicircle disk axle (90) on the axle fixing unit (80) and holds the cornet cone packages (300) on the stacking table (10) at certain intervals and pulls the same, a separator arm (120) which moves back and forth by being connected on the axle fixing unit (80) by means of the separator axle (110) and advances one cornet cone package (300) at a time with its back-and-forth movement, a fixing arm (130) which is connected to the separator arm (120) and which moves up and down by means of the separator movement arm (140) that moves up and down, a sled (150) which extends forwards from the back surface of the axle fixing unit (80) and carries the cornet cone packages (300) pulled with the semicircle disk (100) for the crimping procedure, a lower crimping head (160) and an upper crimping head (180) which crimp the cornet cone packages (300) carried inside the sled (150) and bring them into conical cone packages (301), having reverse rotational movements, a cone stacking unit (200) which stacks the conical cone packages (301) within each other, a cone conveyor belt (210) which pulls the conical cone packages (301) into the cone stacking unit (200) from the lower crimping head (160) and upper crimping head (170).

In the production machine of the invention, the specifically shaped cornet cone packages (300) are stacked next to each other on the package stacking table (10) in order to be brought into cone form. The cornet cone packages (300) on said stacking table (10) are pushed forward by means of a pusher table (20) from their back side. There is a pusher arm (30) behind the pusher table (20). The pusher arm (30) applies a forward driving force on the pusher table (20).

On both sides of the stacking table (10), there are limiter arms (11) which prevent the cornet cone packages (300) pressed by the pusher table (20) collectively, and arranging arms (12) which provide that the cornet cone packages (300) are arranged within the stacking table (10) next to each other in an orderly manner.

The cornet cone packages (300) on the stacking table (10) are pressed by means of the upper pressing table (40) on the top and prevented from getting mixed. There is an upper pressing arm (50) on the upper pressing table (40). The upper pressing arm (50) applies a downward driving force on the upper pressing table (40).

To the cornet cone packages (300) on the stacking table (10) air is blown by means of an air hose (60) which has at least one hose arm (70) and it is provided that the cornet cone packages (300) are separated from each other.

An axle fixing unit (80) is positioned at the front of the stacking table (10). At least one semicircle disk (100) is connected on said axle fixing unit (80) such that it will make a rotational movement by means of the semicircle disk axle (90). Said semicircle disk (100) holds the cornet cone packages (300) on the stacking table (10) by making a rotational movement by means of the semicircle disk axle (90) and pulls the same. The semicircle disk (100) contacts the cornet cone packages (300) at certain time intervals as per its semicircle form and provides that the cornet cone packages (300) are pulled as spaced from each other.

A separator arm (120) is connected on the axle fixing unit (80) which moves back and forth by means of the separator axle (110) in the way to be aligned on the semicircle disk axle (90).

Said separator arm (120) advances one cornet cone package (300) at a time by moving back and forth by means of the separator axle (110). A fixing arm (130) which moves up and down is connected to the separator arm (120) by means of a separator movement arm (140) which moves up and down.

A sled (150) extends forwards from the back side of the axle fixing unit (80). The sled (150) carries the cornet cone packages (300) that are pulled with the semicircle disk (100) which makes a rotational movement for the crimping procedure.

There is a lower crimping head (160) and an upper crimping head (180) which are located at the end of the sled (150), and which crimp the cornet cone packages (300) carried inside the sled (150) and bring them into conical cone packages (301), having reverse rotational movements. Said lower crimping head (160) and an upper crimping head (180) make reverse rotational movements from each other by means of the lower crimper motor (170) and the upper crimper motor (190), respectively.

There is a cone stacking unit (200) which is positioned between the lower crimping head (160) and upper crimping head (180), and which stacks the conical cone packages (301) within each other. Said cone stacking unit (200) has a cone conveyor belt (210) that pulls the conical cone packages (301) from the lower crimping head (160) and upper crimping head (170) into the cone stacking unit (200).

The Working Principle of the Production Machine According to the Invention is as Follows The specifically shaped cornet cone packages (300) are stacked next to each other on the stacking table (10) with the air blown by means of an air hose (60) that has at least one hose arm (70) to separate the same. In the meantime, said semicircle disk (100) which makes a rotational movement holds the cornet cone packages (300) on the stacking table (10) by making a rotational movement by means of the semicircle disk axle (90) and pulls the same.

The cornet cone packages (300) positioned within the sled (150) are brought into a conical cone package (301) by being crimped by means of a lower crimping head (160) and an upper crimping head (180) that has a reverse rotational movement from each other.

The conical cone packages (301) are arranged within each other by being pulled from the lower crimping head (160) and upper crimping head (180) by means of the cone conveyor belt (210) and falls into the cone stacking unit (200) as stacked within each other.

The invention claimed is:

1. A cornet cone package production machine comprising:

a stacking table adapted to allow cornet cone packages to be stacked side-by-side;

a pusher table positioned adjacent said stacking table, said pusher table adapted to advance the cornet cone package forwardly on said stacking table;

an upper pressing table cooperative with said stacking table and adapted to press onto the cornet cone package;

an air hose directed toward to said stacking table and adapted to separate the cornet cone packages, said air hose being supported by at least one hose arm;

an axle fixing unit positioned at a front of said stacking table;

a semicircular disk rotatably positioned on said axle fixing unit, said semicircular disk and said axle fixing unit adapted to hold the cornet cone packages in spaced relation and to pull on the cornet cone package;

a separator arm that is movable back-and-forth on said axle fixing unit, said separator arm adapted to advance each cornet cone package of the cornet cone packages with the back-and-forth movement;

a fixing arm connected to said separator arm, said fixing arm being movable upwardly and downwardly by a separator movement arm, the separator movement arm being movable upwardly and downwardly;

a sled extending forwardly from the back surface of said axle fixing unit, said sled adapted to carry the cornet cone packages pulled by said semicircular disk;

a lower crimping head;

an upper crimping head cooperative with said lower crimping head, said lower crimping head and said upper crimping head adapted to crimp the cornet cone package carried by said sled;

a cone stacking unit positioned opposite said lower crimping head and upper crimping head, said cornet stacking unit adapted to stack the cornet cone packages one within each other; and a cone conveyor belt cooperative with said cone stacking unit and adapted to pull the cornet cone package from said lower crimping head and said upper crimping head.

2. The cornet cone package production machine of claim 1, further comprising:

a pusher arm positioned behind said pusher table so as to apply a forward driving force to said pusher table.

3. The cornet cone package production machine of claim 1, further comprising:

an upper pressing arm positioned on said upper pressing table, said upper pressing arm applying downward driving force to said upper pressing table.

4. The cornet cone package production machine of claim 1, further comprising:

a semicircular disk axle connecting said semicircular disk to said axle fixing unit.

5. The cornet cone package production machine of claim 4, further comprising:

a separator axle connecting said separator arm onto said axle fixing unit so as to align with said semicircular disk axle.

6. The cornet cone package production machine of claim 1, further comprising:

a limiter arm positioned on opposite sides of said stacking table, said limiter arm adapted to prevent the cornet cone packages pressed by said pusher table from being collectively pushed.

7. The cornet cone package production machine of claim 1, further comprising:

an arranging arm positioned on opposite sides of said stacking table, said arranging arm adapted to arrange the cornet cone package with said stacking table next to each other.

* * * * *